United States Patent [19]

Watanabe et al.

[11] Patent Number: 5,115,006
[45] Date of Patent: May 19, 1992

[54] RUBBER COMPOSITION

[75] Inventors: Hiroyuki Watanabe, Yokohama; Kohkichi Noguchi, Kamakura; Shuichi Akita; Kumiko Kohtaki, both of Yokohama, all of Japan

[73] Assignee: Nippon Zeon Co., Ltd., Tokyo, Japan

[21] Appl. No.: 642,558

[22] Filed: Jan. 18, 1991

Related U.S. Application Data

[63] Continuation of Ser. No. 465,621, Jan. 22, 1990, abandoned, which is a continuation of Ser. No. 156,024, Feb. 16, 1988, abandoned.

[30] Foreign Application Priority Data

Feb. 16, 1987 [JP] Japan ................................ 62-32657

[51] Int. Cl.$^5$ .............................................. C08K 3/20
[52] U.S. Cl. ................................ 524/251; 524/572; 525/241
[58] Field of Search ................. 524/251, 572; 525/241

[56] References Cited

U.S. PATENT DOCUMENTS

| | | | |
|---|---|---|---|
| 3,351,459 | 6/1969 | Bevilaqua | 524/251 |
| 3,502,612 | 3/1970 | Latos | 524/251 |
| 4,257,468 | 3/1981 | Ogawa | 524/251 |
| 4,357,432 | 11/1982 | Edwards | 524/251 |
| 4,647,625 | 3/1987 | Aonuma | 525/375 |

*Primary Examiner*—Joseph L. Schofer
*Assistant Examiner*—Peter D. Mulcahy
*Attorney, Agent, or Firm*—Sherman and Shalloway

[57] ABSTRACT

A rubber composition capable of giving a vulcanized rubber having improved rebound and elongation at break. The composition consists essentially of (1) 100 parts by weight of a rubber component composed of (a) 10 to 100% by weight of a modified conjugated diene polymer obtained by reacting a conjugated diene polymer having an alkali metal and/or an alkaline earth metal bonded thereto with a compound containing the

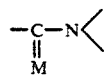

bond in which M represents an oxygen or sulfur atom in the molecule, said modified conjugated diene polymer consisting essentially of 50 to 100% by weight of at least one $C_4$–$C_{12}$ conjugated diene monomer and 0 to 50% by weight of an aromatic vinyl monomer, the amount of said compound bonded being at least 0.1 mole per mole of said polymer, and (b) 90 to 0% by weight of at least one rubber selected from the group consisting of styrene-butadiene copolymer rubber, styrene-isoprene copolymer rubber, polybutadiene rubber, polyisoprene rubber, butadiene-isoprene copolymer rubber, polyalkenamers and natural rubber, and (2) 0.01 to 1 part by weight of at least one amine selected from the group consisting of aliphatic primary amines and alicyclic primary amines.

13 Claims, No Drawings

RUBBER COMPOSITION

This application is a continuation of application Ser. No. 07/465,621 filed Jan. 22, 1990, now abandoned which is a continuation of application Ser. No. 07/156,024 filed Feb. 16, 1988 now abandoned.

This invention relates to a rubber composition capable of giving a vulcanized rubber having improved rebound and elongation at break. More specifically, this invention relates to a rubber composition consisting essentially of a modified conjugated diene polymer prepared by reacting a conjugated diene polymer having an alkali metal and/or an alkaline earth metal bonded to the polymer chain with a compound containing the

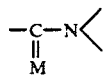

bond wherein M represents an oxygen or sulfur atom, and a specific amine.

In recent years, rubbery materials having low rolling frictional resistance (corresponding to high rebound) and high wet skid resistance have been strongly desired for use in automobile tire treads because of the requirements for low fuel costs and high driving safety of automobiles. These two characteristics, however, are contradictory, and in order to set a compromise between them, various methods for improving the polymers used to make these materials have been proposed.

The present inventors previously found that the above desire can be achieved by reacting a diene polymer having an active alkali metal and/or an alkaline earth metal at the terminals with a compound having the

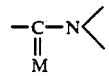

bond wherein M represents an oxygen or sulfur atom in the molecule to thereby introduce a specific atomic grouping into the polymer chain (see U.S. Pat. No. 4,647,625). Rubber having the above specific atomic grouping introduced thereinto has improved rebound but the elongation at break of the vulcanized rubber is markedly reduced. The reduction in elongation at break causes a reduction in the strength properties of the rubber, and this is considered to be one cause of susceptibility to demold splitting at the time of taking out the molded tire from the mold during tire production and of the imperfection of the tread pattern during tire running.

It is an object of this invention to provide a rubber composition which comprises a diene polymer having the aforesaid compound bonded thereto and has an excellent balance between rolling resistance and wet skid resistance and little reduction in elongation at break.

The object of the invention is achieved by a composition consisting essentially of (1) 100 parts by weight of a rubber component composed of a) 10 to 100% by weight of a modified conjugated diene polymer obtained by reacting a conjugated diene polymer having an alkali metal and/or an alkaline earth metal bonded thereto with a compound containing the

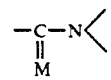

bond in which M represents an oxygen or sulfur atom in the molecule, said modified conjugated diene polymer consisting essentially of 50 to 100% by weight of at least one $C_4$–$C_{12}$ conjugated diene monomer and 0 to 50% by weight of an aromatic vinyl monomer, the amount of said compound bonded being at least 0.1 mole per mole of said polymer, and (b) 90 to 0% by weight of at least one rubber selected from the group consisting of styrene-butadiene copolymer rubber, styrene-isoprene copolymer rubber, polybutadiene rubber, polyisoprene rubber, butadiene-isoprene copolymer rubber, polyalkenamers and natural rubber, and (2) 0.01 to 1 part by weight of at least one amine selected from the group consisting of aliphatic primary amines and alicyclic primary amines.

According to this invention as applied, for example, to tires, rolling resistance and braking property on a wet road surface (i.e., wet skid resistance), which are the important properties of tires now in use, can be harmonized and balanced at a high level. It is also possible to decrease the reduction in the elongation at break of vulcanizates which is the disadvantage with rubbery polymers obtained by reacting a conjugated diene polymer having an alkali metal and/or an alkaline earth metal bonded thereto with a compound having the

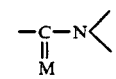

bond wherein M represents an oxygen or sulfur atom.

The conjugated diene polymer used in this invention may be any conjugated diene polymer produced by any polymerization methods such as solution polymerization or emulsion polymerization, for example homopolymers and copolymers of $C_4$–$C_{12}$ conjugated diene monomers such as butadiene, isoprene, chloroprene and 1,3-pentadiene; copolymers of conjugated diene monomers with aromatic vinyl compounds such as styrene or alpha-methylstyrene (usually, the aromatic vinyl compounds are used in an amount of not more than 50% by weight). Specific examples include polybutadiene rubber, polyisoprene rubber, polychloroprene rubber, styrene-butadiene copolymer rubber (usually the amount of styrene bonded is not more than 50% by weight), styrene-isoprene copolymer rubber usually the amount of styrene bonded is not more than 50% by weight), butadiene-isoprene copolymer rubber, polypentadiene rubber, butadiene-pentadiene copolymer rubber, isoprene-pentadiene copolymer rubber and pentadiene-styrene copolymer rubber. These examples are not limitative. The type of the microstructure of the conjugated diene units in these polymers is not restricted.

The compound having the

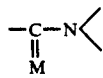

bond where M represents an oxygen or sulfur atom used in this invention is a chain or cyclic compound. Examples include amides such as N,N-dimethylformamide, N,N-diethylformamide, N,N-diethylacetamide, aminoacetamide, N,N-dimethyl-N',N'-dimethylaminoacetamide, N-phenyldiacetamide, N,N-dimethyl-acrylamide, N,N-dimethylmethacrylamide, propionamide, N,N-dimethylpropionamide, 4-pyridylamide, N,N-dimethyl-4-pyridylamide, N,N-dimethylbenzamide, p-aminobenzamide, N',N'-(p-dimethylamino)-benzamide, N,N-dimethyl-N'-(p-ethylamino)benzamide, N-acetyl-N-2-naphthylbenzamide, nicotinamide, N,N-diethylnicotinamide, succinamide, maleinamide, N,N,N',N'-tetramethylmaleinamide, oxamide, 2-furamide, N,N,N',N'-tetramethyloxamide, N,N-dimethyl-2-furamide, N,N-dimethyl-p-amino-benzalacetamide, N,N-dimethyl-N',N'-(p'-dimethylamino)cinnamylideneacetamide, N,N-dimethyl-N',N'-(2-dimethylamino)vinylamide and N'-(2-methylamino)vinylamide; imides such as succinimide, maleimide, N-methylmaleimide, N-methylphthalimide, 1,2-cyclohexanedicarboximide and N-methyl-1,2-cyclohexane-dicarboximide; ureas such as 1,3-dimethylethyleneurea, N,N'-diethylpropyleneurea, N-methyl-N'-ethyl-propyleneurea, 1,3-dimethyl-2-imidazolidinone and 1-methyl-3-ethyl-2-imidazolidinone; carbamic acid derivatives such as methyl carbamate and ethyl N,N-diethylcarbamate; lactams such as epsilon-caprolactam, N-methyl-epsilon-caprolactam, N-acetyl-epsilon-caprolactam, 2-pyrrolidone, N-methyl-2-pyrrolidone, N-acetyl-2-pyrrolidone, N-vinylpyrrolidone, 2-piperidone and N-methyl-2-piperidone; quinolones such as 2-quinolone, N-methyl-2-quinolone; indolinones such as 2-indolinone and N-methyl-2-indolinone; isocyanuric acid compounds such as isocyanuric acid and N,N',N''-trimethyl-isocyanuric acid; and sulfur-containing compounds corresponding to the above-exemplified compounds. Especially preferred are those in which an alkyl group is bonded to nitrogen.

The modified conjugated diene polymer may be obtained by reacting the above compound with the conjugated diene polymer having an alkali metal and/or an alkaline earth metal bonded thereto, for example in accordance with the method described in U.S. Pat. No. 4,647,625. For example, it may be obtained by (i) polymerizing a conjugated diene monomer using an alkali metal base catalyst and/or an alkaline earth metal base catalyst, and adding the aforesaid compound to the living conjugated diene polymer solution left after completion of the polymerization reaction, or (ii) bonding an alkali metal and/or an alkaline earth metal to the conjugated diene polymer in a solution of the conjugated diene polymer in a suitable solvent, and subsequently adding the aforesaid compound and reacting it with the polymer.

The alkali metal-base catalyst used in the polymerization reaction and the addition reaction may be, for example, an alkali metal itself such as lithium, rubidium or cesium, a hydrocarbon compound of the metal, or a complex of the metal with a polar compound (such as n-butyllithium, 2-naphthyllithium, potassium-tetrahydrofuran complex and potassium-diethoxyethane complex). The alkaline earth metal-base catalyst may be, for example, catalyst systems composed mainly of compounds of barium, strontium and calcium described for example, in Japanese Laid-Open Patent Publications Nos. 115590/1976, 9090/1977 and 100146/1982. These metal-base catalysts may be any of those which are usually employed as catalysts for solution polymerization.

The amount of the compound containing the

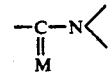

bond (M is an oxygen or sulfur atom) in the molecule is 0.05 to 10 moles, preferably 0.2 to 2 moles, per mole of the catalyst used in producing the living conjugated diene polymer in the case of the method (i) above. In the case of the method (ii for producing the metal-bonded conjugated diene polymer by after-reaction, the amount of the catalyst used is usually 0.1 to 2.0 millimoles per 100 grams of the polymer. The amount of this compound per mole of the catalyst is the same as in the method (i). In either case, the amount of the compound bonded should be at least 0.1 mole, preferably 0.3 to 5 moles, per mole of the conjugated diene polymer.

After the reaction, the conjugated diene polymer having the above compound introduced thereinto (i.e., the modified conjugated diene polymer) is recovered from the reaction solution by an ordinary separating method, for example by adding a coagulating agent such as methanol or by steam stripping.

In the resulting modified conjugated diene polymer, the above compound is introduced into the ends of the molecular chain or into the molecular chain as an atomic grouping of the formula

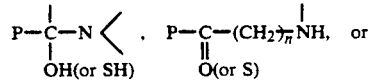

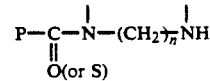

(P represents a polymer chain and n represents an integer).

In the present invention, the product obtained after the reaction may further be reacted with an acid and/or a halogen compound. In this case, there is obtained a modified conjugated diene polymer in which a salt or a charge transfer complex of the above atomic grouping is introduced. This polymer gives much improved rebound.

The site of introduction of the above compound may be the ends or other parts of the molecular chain, preferably the ends of the molecular chain. A modified conjugated diene polymer obtained by reacting a living conjugated diene copolymer having a dienyl structure at the ends of the molecular chain with the aforesaid compound will bring about a greater improvement in rebound.

If desired, before or after the conjugated diene polymer having an alkali metal and/or an alkaline metal bonded thereto is reacted with the aforesaid compound having the specific bond in the molecule, two or more molecules of a coupling agent may be coupled with part of the conjugated diene polymer. Halogenated tin compounds are especially preferred as the coupling agent. Specific examples of the halogenated tin compounds include methyltin trichloride, dimethyltin dichloride, tin tetrachloride, tin dichloride, ethyltin trichloride, diethyltin dichloride, tin tetrafluoride, butyltin trichloride, dibutyltin dichloride, octyltin trichloride, dioctyltin dichloride, dimethyltin dibromide, octyltin tribromide, tin tetrabromide, tin tetraiodide, cyclohexyltin trichloride, phenyltin trichloride, 1,2-bis(trichlorostannyl)ethane, 1,2-bis(methylchlorostannyl)ethane, 1,4-bis(trichlorostannyl)butane and 1,4-bis(methyldichlorostannyl)butane.

The modified conjugated diene polymer obtained as above has a Mooney viscosity ($ML_{1+4}, 100°$ C.) of usually 10 to 200, preferably 20 to 150. If it is less than 10, the resulting composition has inferior mechanical properties such as low tensile strength. If it exceeds 200, the miscibility of the polymer with another rubber is poor, and the processing of the composition becomes difficult. Furthermore, a vulcanizate of the resulting rubber composition has degraded mechanical properties.

The rubber composition of this invention may contain another rubber. Examples of the other rubber are styrene-butadiene copolymer rubber, styrene-isoprene copolymer rubber, polybutadiene rubber, polyisoprene rubber, butadiene-isoprene copolymer rubber, polyalkenamers and natural rubber. At least one of these rubbers is selected according to the purpose for which the resulting composition is used.

The amount of the modified conjugated diene polymer having the aforesaid compound introduced into the polymer chain should be at least 10% by weight, preferably at least 20% by weight, more preferably at least 30% by weight, in the rubber component. If it is less than 10% by weight, no increase in rebound can be expected.

All or part of the rubber component used in this invention may be in the form of oil-extended rubber.

To give a vulcanizate of improved elongation at break, the rubber composition of this invention should contain at least one amine selected from the group consisting of aliphatic primary amines and alicyclic primary amines together with the aforesaid rubber component. The amount of the amine used is 0.01 to 1 part by weight per 100 parts by weight of the rubber component. If it is less than 0.01 part by weight, the elongation at break is only insufficiently improved. If it exceeds 1% by weight, the vulcanization rate of the composition becomes too fast so that the vulcanization is difficult to control. The preferred amount of the amine is 0.1 to 0.5 part by weight.

The amine used in this invention should remain in the rubber without evaporation during the production, processing and vulcanization of the rubber composition. It has a boiling point of at least 130° C., preferably at least 180° C. Only aliphatic primary amines and alicyclic primary amines are effective in this invention, and with other amines, the object of this invention cannot be achieved. Examples of the aliphatic primary amines include aliphatic saturated monoamines such as heptylamine, octylamine, nonylamine, decylamine, undecylamine, laurylamine, tridecylamine, tetradecylamine, pentadecylamine, cetylamine, heptadecylamine and stearylamine; aliphatic saturated diamines such as tetramethylenediamine, pentamethylenediamine and hexamethylenediamine; aliphatic saturated polyamines such as tetraethylenepentamine, nonaethylenedecamine, 1,3-bis(2'-aminoethylamino)propane, triethylene-bis(trimethylene)hexamine, 1,3-bis(3'-aminopropylamino)propane, N-(4-aminobutyl)cadaverine, bis(5-aminopentyl)amine, spermine, 1,3-bis(3'-aminopropylamino)propane, 1,6-bis(2'-aminoethylamino)hexane, 1,22-diamino-3,10,13,20-tetrazadocosane, 1,10-bis(aminoethylamino)decane, 1-(2'-aminoethyl)piperazine and 1-[2,-(2''-aminoethylamino)ethyl]piperazine; aliphatic unsaturated monoamines such as undecenylamine; and aminoalcohols such as isopropanolamine, alaninol, 1-aminopropan-3-ol, 2-aminobutan-1-ol, 2-amino-2-methylpropan-1-ol, aminopentan-5-ol, 1-aminopropane-2,3-diol and 1,3-diaminopropan-2-ol. Examples of the alicyclic primary amines are cyclohexylamine, 1-methylcyclohexylamine, 2-methylcyclohexylamine, 1,3-diaminocyclohexane, cycloheptylamine and 2-cycloheptenylamine.

The amine may be added by any desired method. For example, it is possible to add the amine to a solution of the modified conjugated diene obtained by reacting the conjugated dine polymer having an alkali metal and/or an alkaline earth metal bonded thereto with the compound having the

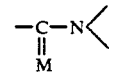

bond wherein M is an oxygen or sulfur atom in the molecule, or to the aqueous slurry at the time of steam stripping, or to the rubber at the time of rubber drying, or to the rubber composition during its production.

The rubber composition may contain various additives in addition to the essential components described above. These additives are incorporated by using a mixer such as a roll or a Banbury mixer. These additives may be selected from those used in the rubber industry to suit the purpose for which the final rubber composition is used, and used in suitable amounts. Usually, there may be added sulfur, stearic acid, zinc oxide, various vulcanization accelerators (thiazoles, thiurams and sulfenamides) and organic peroxides as vulcanization systems, various grades of carbon black such as HAF and ISAF and silica as reinforcing agents, calcium carbonate and talc as fillers, and other additives such as process oils, processing aids, vulcanization retarders and antioxidants.

The rubber composition of this invention has rebound and wet skid resistance which are harmonized at a high level and gives a vulcanizate having an excellent elongation at break. Accordingly, it is suitable as a rubber material for automobile tire treads. It is also useful in automobile tires, shoe soles, floor materials and antivibration rubbers.

The following examples illustrate the present invention more specifically. Unless otherwise specified, all parts and percentages in these examples are by weight.

EXAMPLE 1

In each run, a 2-liter stainless steel polymerization reactor was washed and dried and purged with dry nitrogen. Then, 100 g of 1,3-butadience, 18 g of styrene, 840 g of cyclohexane, 0.9 mmole of n-butyllithium and tetramethylethylenediamine (randomizer) in each of the amounts indicated in Table 1. With stirring, the monomers were polymerized at 60° for 2 hours. After the polymerization reaction, 0.07 millimole of tin tetrachloride was added, and the reaction was carried out for 15 minutes. Further more, each of the compounds having the

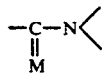

bond indicated in Table 1 was added in the same molar proportion as n-butyllithium, and the reaction was carried out for 15 minutes. Then, 5 ml of methanol was added. One gram of 2,6-di-t-butyl-p-cresol (BHT) and each of the amines shown in Table 1 in each of the amounts indicated (parts per 100 parts of rubber) were added. The polymer solution was taken out, and steam was blown into it to remove the solvent and coagulate the resulting monomer in warm water. The water-containing polymer rubber was dehydrated with a roll, and dried in vacuum at 60° C. for 24 hours.

The resulting polymer rubber was examined for the content of a vinyl bond and the content of styrene by infrared spectrophotometry [Hampton, Anal. Chem., 21, 923 (1949)], and the results are shown in Table 1. The Mooney viscosity ($ML_{1+4}$, 100° C.) of the polymer rubber was also measured, and the results are shown in Table 1.

test pieces were prepared and subjected to the following tests.

TABLE 2

| Compounding recipe | |
|---|---|
| Polymer rubber | 100 parts by weight |
| Zinc oxide No. 3 | 3 |
| Stearic acid | 1.5 |
| Sulfur | 1.75 |
| HAF carbon black | 50 |
| Aromatic process oil | 5 |
| N-Cyclohexyl-2-benzothiazole sulfenamide | 1.0 |

Tensile test
Carried out in accordance with JIS D-6301.
Wet skid resistance
Measured on a road surface at 23° C. (ASTM E-303-74, outdoor type B, black, safety walk, made by 3M Company) by using a portable skid tester (made by Stanley Co., Britain). SBR-1502 was used as a standard, and the measured values were converted into indices.
Rebound
A test piece was placed in a constant temperature vessel kept at 60° C. for 1 hour, and then using the device described in JIS K-6301, the rebound of the specimen was quickly measured. The measured value in the fourth measurement was recorded.
Vulcanization rate

TABLE 1

| Run No. | | Compound containing —C(=M)—N< bond | Randomizer (millimoles) | Amine Type | Amount (parts) | Vinyl bond content (mole %) | Styrene content (%) | Mooney Viscosity ($ML_{1+4}$, 100° C.) |
|---|---|---|---|---|---|---|---|---|
| Invention | 1 | N-methyl-epsilon-caprolactam | 2.0 | cyclohexylamine | 0.2 | 71.5 | 15.2 | 45 |
| | 2 | N-methyl-epsilon-caprolactam | 2.0 | 2-ethylhexylamine | 0.2 | 71.1 | 15.2 | 48 |
| | 3 | N-methyl-epsilon-caprolactam | 2.0 | dodecylamine | 0.2 | 71.5 | 15.5 | 46 |
| | 4 | N-methyl-epsilon-caprolactam | 2.0 | stearylamine | 0.2 | 71.8 | 15.0 | 45 |
| | 5 | N-methyl-epsilon-caprolactam | 2.0 | cyclohexylamine | 0.2 | 71.1 | 0 | 45 |
| | 6 | N-methyl-epsilon-caprolactam | 0 | cyclohexylamine | 0.2 | 11.2 | 0 | 35 |
| | 7 | N-methyl-2-pyrrolidone | 2.0 | cyclohexylamine | 0.2 | 71.1 | 15.0 | 44 |
| Comparison | 8 | N-methyl-epsilon-caprolactam | 2.0 | — | — | 71.1 | 15.0 | 47 |
| | 9 | N-methyl-epsilon-caprolactam | 2.0 | dicyclohexylamine | 0.2 | 70.9 | 15.2 | 44 |
| | 10 | N-methyl-epsilon-caprolactam | 2.0 | tricyclohexylamine | 0.2 | 71.5 | 15.2 | 48 |
| | 11 | N-methyl-epsilon-caprolactam | 2.0 | m-tolylenediamine | 0.2 | 71.5 | 15.0 | 42 |
| | 12 | N-methyl-epsilon-caprolactam | 2.0 | diphenylamine | 0.2 | 71.1 | 14.8 | 45 |
| | 13 | N-methyl-epsilon-caprolactam | 2.0 | triphenylamine | 0.2 | 71.8 | 15.2 | 43 |
| | 14 | N-methyl-epsilon-caprolactam | 2.0 | dicyclohexylamine | 0.2 | 71.9 | 0 | 47 |
| | 15 | N-methyl-epsilon-caprolactam | 0 | dicyclohexylamine | 0.2 | 11.4 | 0 | 37 |
| | 16 | N-methyl-epsilon-caprolactam | 2.0 | cyclohexylamine | 1.2 | 71.5 | 15.5 | 45 |
| | 17 | N-methyl-epsilon-caprolactam | 2.0 | — | — | 71.7 | 15.1 | 46 |

The resulting polymer rubber was kneaded and mixed in a 250 ml. Bravender-type mixer in accordance with the compounding recipe shown in Table 2 to obtain a rubber composition. The composition was vulcanized at 160° C. for 10 to 30 minutes using a press, and The vulcanization rate was evaluated in terms of scorch time which tends to become a problem in molding and processing. The scorch time is defined as the time ($t_5$) required for the torque to increase by 5% of the balance between the maximum torque and the minimum torque during the 40 minute's period from the beginning of measurement at 160° C. using the device described in ASTM D2-84-81.

The test results are shown in Table 3.

It is seen from Table 3 that Runs Nos. 1 to 4 (invention) showed equivalent wet skid resistance and rebound to Runs Nos. 8 to 13 (comparison) and improved elongation at break over the latter. Run No. 7 (invention) in which N-methyl-2-pyrrolidone was used instead of N-methyl-epsilon caprolactam in Runs Nos. 1 to 4 as the compound containing the

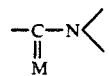

bond showed an improvement in elongation at break over Runs Nos. 8 to 13 (comparison). It is also seen that Runs Nos. 5 and 6 (invention) showed equivalent wet skid resistance and rebound to Runs Nos. 14 and 15 (comparison) and improved elongation at break over the latter.

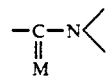

bond can be improved. If, however, the amount of the specific amine used in accordance with this invention is more than 1 part per 100 parts of rubber (Run No. 16, comparison), a vulcanizate of the resulting rubber composition shows an improved elongation at break. Since, however, the scorching time is extremely short, it is difficult to mold and process the rubber compositions.

EXAMPLE 2

Styrene-butadiene copolymer rubber (S-SBR) was prepared in the same way as in Example 1. Polybutadiene rubbers (BR-1 and BR-2) were prepared in the same way as in Example 1 except that 118 g of butadiene was used instead of 100 g of butadiene and 18 g of styrene. Cyclohexylamine was added to a blend of S-SBR, BR-1 or BR-2 and natural rubber (RSS#3) or emulsion-

TABLE 3

| Run No. | | Tensile strength (kg/cm$^2$) | Elongation (%) | 300% Tensile stress (kg/cm$^2$) | Wet skid resistance (index) | Rebound at 60° C. (%) | Scorch time at 160° C. $t_5$ (min.) |
|---|---|---|---|---|---|---|---|
| Invention | 1 | 233 | 400 | 150 | 114 | 65 | 4.8 |
| | 2 | 240 | 410 | 152 | 114 | 65 | 4.9 |
| | 3 | 234 | 400 | 151 | 114 | 64 | 4.8 |
| | 4 | 230 | 390 | 153 | 114 | 65 | 4.7 |
| | 5 | 193 | 340 | 162 | 110 | 66 | 6.5 |
| | 6 | 170 | 380 | 135 | 75 | 73 | 3.5 |
| | 7 | 239 | 410 | 150 | 114 | 64 | 4.8 |
| Comparison | 8 | 228 | 360 | 165 | 114 | 65 | 5.6 |
| | 9 | 230 | 360 | 164 | 114 | 64 | 5.0 |
| | 10 | 226 | 350 | 166 | 114 | 65 | 5.1 |
| | 11 | 230 | 370 | 160 | 114 | 64 | 4.9 |
| | 12 | 225 | 360 | 163 | 114 | 65 | 4.5 |
| | 13 | 232 | 360 | 166 | 114 | 63 | 5.1 |
| | 14 | 192 | 320 | 178 | 110 | 66 | 7.0 |
| | 15 | 165 | 350 | 140 | 75 | 72 | 4.0 |
| | 16 | 245 | 430 | 142 | 114 | 64 | 2.0 |
| | 17 | 217 | 430 | 133 | 114 | 55 | 5.8 |

Thus, it is seen that according to the present invention in which the specific amines are used, the elongation at break of the rubbery polymer obtained by reacting the conjugated diene polymer having an alkali metal and/or an alkaline earth metal bonded thereto with the compound containing the polymerized SBR (SBR-1502), and the resulting composition was tested as in Example 1. The blending ratio, the amount of cyclohexylamine added and the test results are shown in Table 4.

It is seen from Table 4 that Runs Nos. 18 to 23 (invention) show equivalent wet skid resistance to Runs Nos. 24 to 29 (comparison) and improved elongation at break over the latter.

TABLE 4

| Compounding and properties | Run No. | | | | | | | | | | | | | |
|---|---|---|---|---|---|---|---|---|---|---|---|---|---|---|
| | Invention | | | | | | Comparison | | | | | | | |
| | 18 | 19 | 20 | 21 | 22 | 23 | 24 | 25 | 26 | 27 | 28 | 29 | 30 | 31 |
| S-SBR (°1) | 50 | 50 | — | — | — | — | 50 | 50 | — | — | — | — | — | — |
| BR-1 (°2) | — | — | 50 | 50 | — | — | — | — | 50 | 50 | — | — | — | — |
| BR-2 (°3) | — | — | — | — | 50 | 50 | — | — | — | — | 50 | 50 | — | — |
| Natural rubber (RSS #3) | 50 | — | 50 | — | 50 | — | 50 | — | 50 | — | 50 | — | 100 | — |
| SBR-1052 (°4) | — | 50 | — | 50 | — | 50 | — | 50 | — | 50 | — | 50 | — | 100 |
| Amount (parts) of cyclohexylamine | 0.3 | 0.3 | 0.3 | 0.3 | 0.3 | 0.3 | 0 | 0 | 0 | 0 | 0 | 0 | 0 | 0 |
| Tensile strength (kg/cm$^2$) | 265 | 260 | 242 | 238 | 234 | 230 | 260 | 261 | 245 | 230 | 226 | 228 | 290 | 294 |
| Elongation (%) | 470 | 430 | 440 | 400 | 440 | 410 | 440 | 400 | 420 | 380 | 420 | 390 | 530 | 470 |
| 300% tensile stress (kg/cm$^2$) | 150 | 159 | 152 | 163 | 142 | 149 | 158 | 166 | 165 | 171 | 146 | 150 | 148 | 162 |
| Wet skid resistance (index) | 102 | 108 | 101 | 105 | 83 | 88 | 102 | 108 | 101 | 105 | 83 | 88 | 90 | 100 |
| Rebound at 60° C. (%) | 64 | 61 | 65 | 61 | 68 | 65 | 63 | 61 | 65 | 51 | 67 | 65 | 62 | 56 |

TABLE 4-continued

| Compounding and properties | Run No. | | | | | | | | | | | | |
|---|---|---|---|---|---|---|---|---|---|---|---|---|---|
| | Invention | | | | | | Comparison | | | | | | |
| | 18 | 19 | 20 | 21 | 22 | 23 | 24 | 25 | 26 | 27 | 28 | 29 | 30 | 31 |
| Scorch time (t₅) (minutes) | 3.8 | 5.2 | 4.6 | 6.1 | 3.3 | 4.5 | 4.3 | 5.5 | 4.9 | 6.5 | 3.5 | 4.8 | 3.0 | 5.6 |

(*1) Vinyl bond content 71.9 mole %, styrene content 15.5%, Mooney viscosity 47
(*2) Vinyl bond content 70.8 mole %, Mooney viscosity 48
(*3) Vinyl bond content 11.5 mole %, Mooney viscosity 34
(*4) Nipol SBR-1502, a product of Nihon Zeon Co., Ltd.

What is claimed is:

1. A rubber composition consisting essentially of
(1) 100 parts by weight of a rubber component composed of (a) 10 to 100% weight of a modified conjugated diene polymer obtained by reacting a conjugated diene polymer having an alkali metal or an alkaline earth metal at the terminals prepared by polymerizing the undermentioned monomer using an alkali metal base catalyst and/or an alkaline earth metal base catalyst with a compound containing the

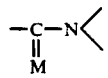

bond in which M represents an oxygen or sulfur atom in the molecule, said modified conjugated diene polymer consisting essentially of 50 to 100% by weight of at least one C₄–C₁₂ conjugated diene monomer and 0 to 50% by weight of an aromatic vinyl monomer, the amount of said compound bonded being at least 0.1 mole per mole of said polymer, and (b) 90 to 0% by weight of at least one rubber selected from the group consisting of styrene-butadiene copolymer rubber, styrene-isoprene copolymer rubber, polybutadiene rubber, polyisoprene rubber, butadiene-isoprene copolymer rubber, polyalkenamers and natural rubber, and
(2) 0.01 to 1 part by weight of at least one amine selected from the group consisting of aliphatic primary amines and alicyclic primary amines.

2. The rubber composition of claim 1 wherein the conjugated diene copolymer is at least one rubber selected from the group consisting of polybutadiene rubber, polyisoprene rubber, butadiene-isoprene copolymer rubber, polypentadiene rubber, polychloroprene rubber, butadiene-pentadiene copolymer rubber, isoprene-pentadiene copolymer rubber, styrene-butadiene copolymer rubber, styrene-isoprene copolymer rubber and styrene-pentadiene copolymer rubber.

3. The rubber composition of claim 1 wherein the amount of said compound containing the

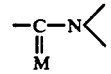

bonded to the conjugated diene polymer is from 0.3 to 5 moles per mole of the polymer.

4. The rubber composition of any one of claims 1 to 5 wherein said compound containing the

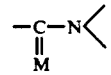

bond is at least one compound selected from the group consisting of amides, imides, ureas, carbamic acid derivatives, lactams, quinolones, indolinones, isocyanuric acid derivatives, and sulfur-containing compounds corresponding to these compounds.

5. The rubber composition of claim 1 wherein a part of said living conjugated diene polymer is coupled with a coupling agent before or after said reaction with a compound containing said

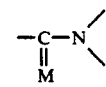

bond.

6. The rubber composition of claim 5 wherein said coupling agent is a halogenated tin compound.

7. The rubber composition of claim 1 wherein said rubber component is composed of at least 20% by weight of said modified conjugated diene polymer.

8. The rubber composition of claim 1 wherein said rubber component is composed of at least 30% by weight of said modified conjugated diene polymer.

9. The rubber composition of claim 1 wherein said at least one amine is present in an amount of 0.1 to 0.5 part by weight.

10. The rubber composition of claim 1 wherein said at least one amine has a boiling point of at least 130° C.

11. The rubber composition of claim 10 wherein said at least one amine has a boiling point of at least 180° C.

12. The rubber composition of claim 1 wherein said aliphatic primary amine is selected from the group consisting of aliphatic saturated monoamines, aliphatic saturated diamines, aliphatic saturated polyamines, aliphatic unsaturated monoamines and aliphatic aminoalcohols.

13. The rubber composition of claim 1 wherein said alicyclic primary amine is selected from the group consisting of cyclohexylamine, 1-methylcyclohexylamine, 2-methylcyclohexylamine, 1,3-diaminocyclohexane, cycloheptylamine and 2-cycloheptenylamine.

* * * * *